(12) United States Patent
Zhang

(10) Patent No.: US 12,200,373 B2
(45) Date of Patent: Jan. 14, 2025

(54) WHITE BALANCE CORRECTION METHOD AND APPARATUS, DEVICE, AND STORAGE MEDIUM

(71) Applicant: ZHEJIANG UNIVIEW TECHNOLOGIES CO., LTD., Zhejiang (CN)

(72) Inventor: Shaokun Zhang, Zhejiang (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 167 days.

(21) Appl. No.: 18/005,822

(22) PCT Filed: Dec. 23, 2020

(86) PCT No.: PCT/CN2020/138490
§ 371 (c)(1),
(2) Date: Jan. 17, 2023

(87) PCT Pub. No.: WO2022/011975
PCT Pub. Date: Jan. 20, 2022

(65) Prior Publication Data
US 2023/0328396 A1 Oct. 12, 2023

(30) Foreign Application Priority Data
Jul. 16, 2020 (CN) .......................... 202010688534.3

(51) Int. Cl.
*H04N 23/88* (2023.01)
*G06T 7/90* (2017.01)

(52) U.S. Cl.
CPC ............... *H04N 23/88* (2023.01); *G06T 7/90* (2017.01); *G06T 2207/10024* (2013.01); *G06T 2207/20081* (2013.01); *G06T 2207/20084* (2013.01)

(58) Field of Classification Search
CPC ........ H04N 23/88; H04N 1/58; H04N 1/6077; H04N 9/73; G06T 7/90;
(Continued)

(56) References Cited

U.S. PATENT DOCUMENTS

2018/0316927 A1* 11/2018 Alakuijala ............... G06T 5/00
2019/0019311 A1    1/2019 Hu et al.
(Continued)

FOREIGN PATENT DOCUMENTS

CN    102209246 A    10/2011
CN    106651795 A    5/2017

OTHER PUBLICATIONS

International Search Report in Application No. PCT/CN2020/138490, dated Apr. 19, 2021, 4 pages including translation.
(Continued)

*Primary Examiner* — Timothy J Henn
(74) *Attorney, Agent, or Firm* — Morgan, Lewis & Bockius LLP

(57) ABSTRACT

Provided are a white balance correction method and apparatus, a device, and a storage medium. The white balance correction method includes: inputting an image to be corrected into a pre-trained chromatic-aberration-free point model to obtain a chromatic-aberration-free point weight map of the image to be corrected; determining, according to the chromatic-aberration-free point weight map, an illumination color parameter of the image to be corrected; and performing, according to the illumination color parameter, white balance correction on the image to be corrected to obtain a corrected image.

17 Claims, 4 Drawing Sheets

---

101 — Input an image to be corrected into a pre-trained chromatic-aberration-free point model to obtain a chromatic-aberration-free point weight map of the image to be corrected 102 — Determine, according to the chromatic-aberration-free point weight map, an illumination color parameter of the image to be corrected 103 — Perform, according to the illumination color parameter, white balance correction on the image to be corrected to obtain a corrected image

(58) Field of Classification Search
CPC . G06T 2207/10024; G06T 2207/20081; G06T 2207/20084; G06T 5/90; G06T 2207/10004; Y02T 10/40; G06N 3/045; G06N 3/048; G06N 3/08; G06N 3/084; G06N 3/04

See application file for complete search history.

(56) References Cited

U.S. PATENT DOCUMENTS

| | | | |
|---|---|---|---|
| 2019/0045163 A1 | 2/2019 | Nikkanen et al. | |
| 2020/0288092 A1* | 9/2020 | Guo | H04N 25/611 |
| 2021/0006760 A1* | 1/2021 | McDonagh | G06N 3/045 |
| 2021/0058596 A1* | 2/2021 | Afifi | G06N 3/045 |
| 2022/0295030 A1* | 9/2022 | Hernandez | H04N 1/6086 |
| 2022/0405896 A1* | 12/2022 | Wan | G06N 3/045 |

OTHER PUBLICATIONS

Extended European Search Report in Application No. 20945215.0, dated Jun. 25, 2024, 10 pages.

Bianco, Simone et al.: "Quasi-Unsupervised Color Constancy", 2019 IEEE/CVF Conference on Computer Vision and Pattern Recognition (CVPR), IEEE, Jun. 15, 2019 (Jun. 15, 2019), pp. 12204-12213.

Yang, Kai-Fu et al.: "Efficient Illuminant Estimation for Color Constancy Using Grey Pixels", 2015 IEEE Conference on Computer Vision and Pattern Recognition (CVPR), IEEE, Jun. 7, 2015 (Jun. 7, 2015), pp. 2254-2263.

* cited by examiner

WHITE BALANCE CORRECTION METHOD AND APPARATUS, DEVICE, AND STORAGE MEDIUM

CROSS REFERENCE TO RELATED APPLICATIONS

This application is a national stage application filed under 35 U.S.C. 371 based on International Patent Application No. PCT/CN2020/138490, filed on Dec. 23, 2020, which claims priority to Chinese Patent Application No. 202010688534.3 filed with the China National Intellectual Property Administration (CNIPA) on Jul. 16, 2020, the disclosures of which are incorporated herein by reference in their entireties.

TECHNICAL FIELD

The present application relates to the field of Internet technology, for example, a white balance correction method and apparatus, a device, and a storage medium.

BACKGROUND

In nature, a color shown by an object changes with an ambient light source of the object. For humans, even if the light source changes, the perception of colors by eyes is not greatly influenced. This is because a brain has certain prior knowledge of a color of the object and can perceive an inherent color of the object from some changing light sources. However, the camera does not have this special function of the human eyes. When capturing images under different light sources, the camera is influenced by the color of the light source. Therefore, white balance correction needs to be performed on the images acquired by the camera.

Common white balance correction algorithms are methods based on statistics, that is, under an assumption, color features of a scene image itself are counted so that the ambient light source is estimated. For example, a common gray-world method, a common perfect reflection method, and the like are simple in principle and easy to implement. However, since the methods are based on too strong assumptions, the use scenes of the methods are limited. The methods based on the statistics generally have the defects of strong assumptions and poor adaptive capabilities.

SUMMARY

The present application provides a white balance correction method and apparatus, a device, and a storage medium, so as to improve the adaptability of white balance correction and further improve the accuracy of a correction result.

A white balance correction method is provided. The method includes the steps described below.

An image to be corrected is input into a pre-trained chromatic-aberration-free point model so that a chromatic-aberration-free point weight map of the image to be corrected is obtained.

An illumination color parameter of the image to be corrected is determined according to the chromatic-aberration-free point weight map.

White balance correction is performed, according to the illumination color parameter, on the image to be corrected so that a corrected image is obtained.

A white balance correction apparatus is further provided. The apparatus includes a weight map determination module, an illumination color determination module, and a white balance correction module.

The weight map determination module is configured to input an image to be corrected into a pre-trained chromatic-aberration-free point model to obtain a chromatic-aberration-free point weight map of the image to be corrected.

The illumination color determination module is configured to determine, according to the chromatic-aberration-free point weight map, an illumination color parameter of the image to be corrected.

The white balance correction module is configured to perform, according to the illumination color parameter, white balance correction on the image to be corrected to obtain a corrected image.

A device is further provided.

The device includes one or more processors and a memory.

The memory is configured to store one or more programs.

When executed by the one or more processors, the one or more programs cause the one or more processors to implement the white balance correction method according to any embodiment of the present application.

A computer-readable storage medium storing computer programs is further provided, where when executed by a processor, the computer programs implement the white balance correction method according to any embodiment of the present application.

DETAILED DESCRIPTION

Figure 1:
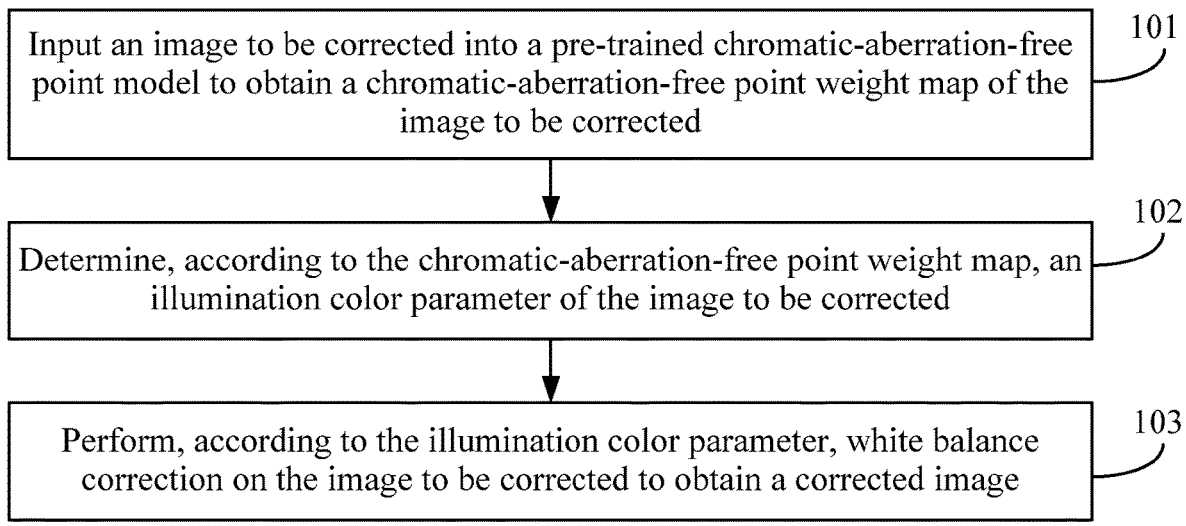
FIG. 1 is a flowchart of a white balance correction method in embodiment one of the present application.

The present application is described below in conjunction with drawings and embodiments. The embodiments described herein are intended to explain the present application and not to limit the present application. For ease of description, only part, not all, of structures related to the present application are illustrated in the drawings.

Embodiment One

FIG. 1 is a flowchart of a white balance correction method in embodiment one of the present application. This embodiment is applicable to the case where white balance correction is performed on an image acquired by a camera. The method may be executed by a white balance correction apparatus. The apparatus may be implemented by software and/or hardware and may be configured in a device. For example, the device may be a device having communication and calculation capabilities such as a backend server. As shown in FIG. 1, the method includes the steps described below.

In step 101, an image to be corrected is input into a pre-trained chromatic-aberration-free point model so that a chromatic-aberration-free point weight map of the image to be corrected is obtained.

The image to be corrected refers to that the image captured by the camera is influenced by different ambient light sources, causing a color of an object to be changed. To overcome this change, the white balance correction needs to be performed on the image to be corrected. The white balance correction refers to that an influence of an ambient light source factor on the color of the object in the image to be corrected is estimated so that the image under the influence of the ambient light source is converted to be under a classic light source, a color of the image to be corrected is restored to be a color under a target light source, and the color of the object in the image to be corrected is restored to an inherent color of the object, that is, the color of the object after the white balance correction of the image to be corrected is the same as or similar to a color perceived by human eyes.

The chromatic-aberration-free point refers to a gray point in the image under a standard white light source, and the ambient light source factor in the image to be corrected may be determined through the chromatic-aberration-free point. The chromatic-aberration-free point model is a pre-trained network model which may extract the chromatic-aberration-free point features in the image to be corrected. The model is used for detecting the chromatic-aberration-free point in the image, where an input of the model is the image to be corrected, and an output of the model is a feature representation of the chromatic-aberration-free point in the image to be corrected, for example, the output may be the chromatic-aberration-free point weight map of the image to be corrected. The chromatic-aberration-free point weight map refers to a map representing a probability that each pixel in the image to be corrected is the chromatic-aberration-free point. For example, the chromatic-aberration-free point weight map has the same size as the image to be corrected, and in the chromatic-aberration-free point weight map, a value of each pixel is the probability that a respective point in the image to be corrected is the chromatic-aberration-free point. For example, a value of each point in the chromatic-aberration-free point weight map ranges from 0 to 255, or the value of each point in the chromatic-aberration-free point weight map is normalized to be in the range of 0 to 1, which may be set according to specific situations and is not limited here.

Pre-training may refer to training the chromatic-aberration-free point model which extracts the chromatic-aberration-free point features in the image, where the image to be corrected is used as the input of the chromatic-aberration-free point model, the chromatic-aberration-free point in the image to be corrected is identified through the model, and the obtained output of the model is the chromatic-aberration-free point weight map corresponding to the image to be corrected. For example, a value of the probability that each pixel in the image to be corrected is the chromatic-aberration-free point is obtained through the chromatic-aberration-free point model, and the chromatic-aberration-free point weight map is formed according to sequence numbers of pixels so that each point in the chromatic-aberration-free point weight map corresponds to the image to be corrected.

In step 102, an illumination color parameter of the image to be corrected is determined according to the chromatic-aberration-free point weight map.

The illumination color parameter is used for determining the influence on the color of the object caused by the ambient light source when the image to be corrected is captured. For example, the inherent color of the object is white, that is, the color of the object captured under the standard white light source is white, and if a color of the object captured under a light source is red, it indicates that an illumination color of the image to be corrected is red and the illumination color parameter may be determined according to specific information of red.

Since the chromatic-aberration-free point is the gray point under the standard white light source, the illumination color may be determined through the chromatic-aberration-free point in the image to be corrected. For example, multiple chromatic-aberration-free points in the image to be corrected may be determined through the chromatic-aberration-free point weight map so that the illumination color parameter when the image to be corrected is captured is determined. For example, the illumination color parameter represents a color of the ambient light source from one aspect, and therefore, the illumination color may be represented by tristimulus values of the color separately.

In an optional embodiment, the illumination color parameter e=[r, g, b] is determined through the following formulas:

$$r = \frac{R_{avg}}{\sqrt{R_{avg}^2 + G_{avg}^2 + B_{avg}^2}}; g = \frac{G_{avg}}{\sqrt{R_{avg}^2 + G_{avg}^2 + B_{avg}^2}} \text{ and}$$

$$b = \frac{B_{avg}}{\sqrt{R_{avg}^2 + G_{avg}^2 + B_{avg}^2}}; \text{ where } R_{avg} = \frac{\Sigma(\omega(x, y) * f^R(x, y))}{\Sigma \omega(x, y)},$$

$$G_{avg} = \frac{\Sigma(\omega(x, y) * f^G(x, y))}{\Sigma \omega(x, y)} \text{ and } B_{avg} = \frac{\Sigma(\omega(x, y) * f^B(x, y))}{\Sigma \omega(x, y)},$$

where $\omega(x, y)$ denotes a chromatic-aberration-free point weight value at a pixel $(x, y)$ determined according to the chromatic-aberration-free point weight map, $\Sigma \omega(x, y)$ denotes a weight sum of all pixels in the chromatic-aberration-free point weight map, $f^R(x, y)$ denotes an R channel value at a pixel $(x, y)$ in the image to be corrected, $f^G(x, y)$ denotes a G channel value at the pixel $(x, y)$ in the image to be corrected, and $f^B(x, y)$ denotes a B channel value at the pixel $(x, y)$ in the image to be corrected.

An RGB-format image f(x) with 8-bit precision is used as an input, an obtained chromatic-aberration-free point weight map of f(x) is $\omega$, the illumination color of the image f(x) to be corrected is set to e, and the tristimulus values [r, g, b] of the color is used for representing e.

r in the illumination color parameter represents an influence caused by the chromatic-aberration-free point of the image to be corrected on an R channel; g in the illumination color parameter represents an influence caused by the chromatic-aberration-free point of the image to be corrected on a G channel; and b in the illumination color parameter represents an influence caused by the chromatic-aberration-free point of the image to be corrected on a B channel.

Three channel values $f^R(x, y)$, $f^G(x, y)$, and $f^B(x, y)$ of the image f(x) to be corrected are determined. A pixel value of each of pixels on each channel is multiplied by a chromatic-aberration-free point weight in the chromatic-aberration-free point weight map and corresponding to the pixel, and a sum of all products is calculated. A chromatic-aberration-free point weight sum of each channel of the image to be corrected is obtained, and a ratio of the of the chromatic-aberration-free point weight sum of each channel to a weight sum in the chromatic-aberration-free point weight map is used as a representation of a degree of an influence of the chromatic-aberration-free points of each channel on the image. Finally, the illumination color parameter is determined according to a proportion of the influence degree of the chromatic-aberration-free points of each channel to an influence degree of chromatic-aberration-free points of the three channels.

The illumination color parameter is determined through the chromatic-aberration-free point weight map and image information of the image to be corrected, and is determined with original information of the image, which is applicable to all scenes under different types of illumination ambience. Therefore, the estimation accuracy of the illumination color is improved, and a deviation in the estimation of a light source color in some scenes is avoided.

In step 103, the white balance correction is performed, according to the illumination color parameter, on the image to be corrected so that a corrected image is obtained.

After the illumination color parameter is determined, the influence of the illumination color on the inherent color of the object may be determined. Therefore, the influence can be eliminated through the determined illumination color parameter, and further, the white balance correction can be implemented.

For example, a gain value of illumination on each channel is obtained according to the illumination color parameter. For example, the gain value of each channel, such as a red gain, a blue gain, and a green gain, is determined through the following formulas:

$$\begin{cases} RGain = 1/r \\ GGain = 1/g; \\ BGain = 1/b \end{cases}$$

where RGain refers to the red gain, GGain refers to the green gain, and BGain refers to the blue gain. The influence caused by the illumination color on the three channels is determined so that an influence elimination operation is implemented.

In an optional embodiment, the corrected image is determined through the following formulas:

$$\begin{cases} white^R(x, y) = f^R(x, y)/r \\ white^G(x, y) = f^G(x, y)/g; \\ white^B(x, y) = f^B(x, y)/b \end{cases}$$

where $white^R(x, y)$ denotes an R channel value at a pixel (x, y) in the corrected image, $white^G(x, y)$ denotes a G channel value at the pixel (x, y) in the corrected image, and $white^B(x, y)$ denotes a B channel value at the pixel (x, y) in the corrected image.

Based on the preceding example, the gain of each channel is determined. Then, a color error caused by the gain of the channel to the pixel value of each channel can be eliminated through the formulas $$\begin{cases} white^R(x, y) = f^R(x, y) * RGain \\ white^G(x, y) = f^G(x, y) * GGain, \\ white^B(x, y) = f^B(x, y) * BGain \end{cases}$$

and then the elimination of the color error is implemented. For example, a quotient of the pixel value of each channel of the image to be corrected by a value of the illumination color parameter on the corresponding channel is a pixel value on the channel after the white balance correction, thereby implementing the white balance correction of the image to be corrected.

In the embodiment of the present application, the chromatic-aberration-free point weight map of the image to be corrected is determined based on the pre-trained chromatic-aberration-free point model, the illumination color parameter of the image to be corrected is obtained according to the chromatic-aberration-free point weight map, and the white balance correction is performed according to the illumination color parameter so that the white balance correction of the image to be corrected is implemented. The white balance correction method in the embodiment of the present application does not limit the scenes of the image to be corrected, which can improve the adaptability of the white balance correction and improve the accuracy of an image correction result.

Embodiment Two

Figure 2A:
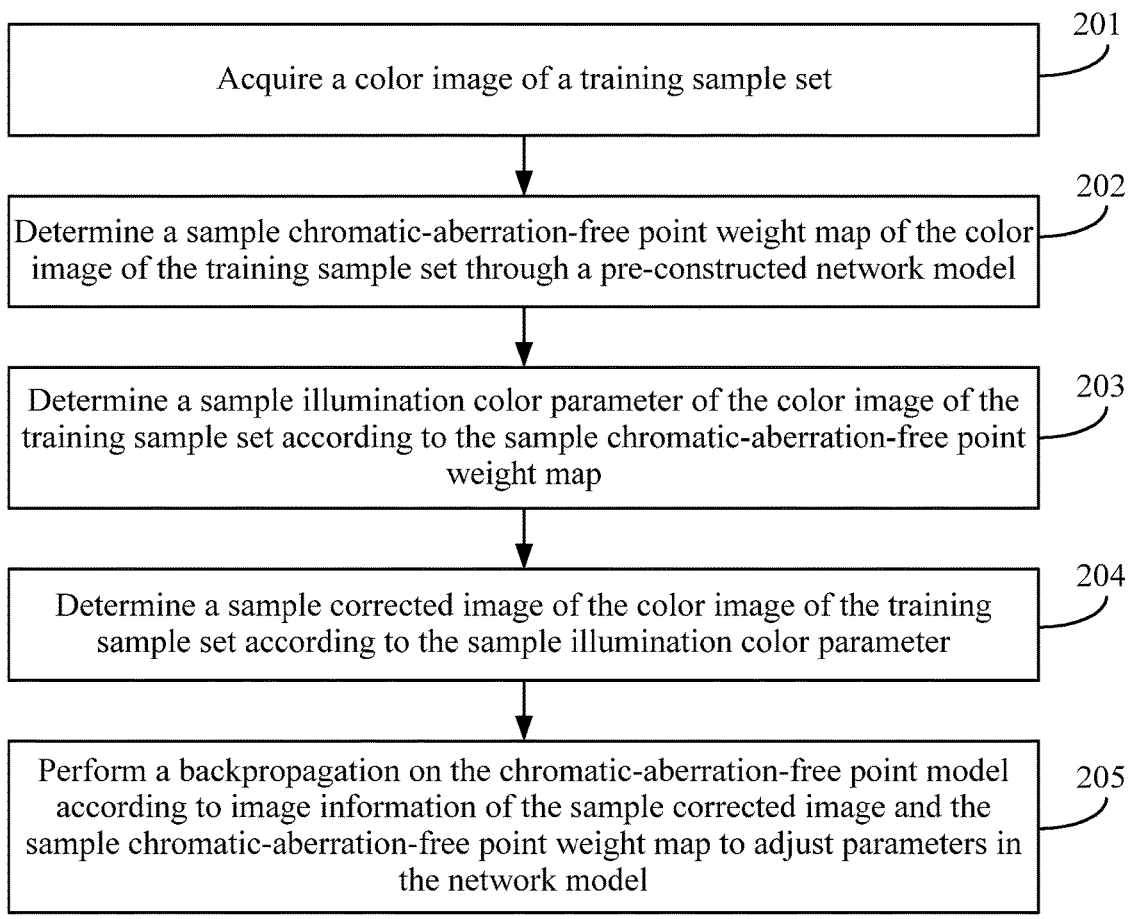
FIG. 2A is a flowchart of a training process of a model of a chromatic-aberration-free point in embodiment two of the present application.

FIG. 2A is a flowchart of a training process of a model of a chromatic-aberration-free point in embodiment two of the present application. In embodiment two, a pre-training process of the chromatic-aberration-free point model in embodiment one is described. As shown in FIG. 2A, the training process includes the steps described below.

In step 201, a color image of a training sample set is acquired.

Since only the color image has color information required for the determination of the illumination color, only color images are used as training samples in the embodiment of the present application. In addition, the color images in the training sample set need to cover as many scenes and light source types as possible, so as to ensure the accuracy and universality of the extraction of the chromatic-aberration-free point features.

Since color images in various formats may be converted through color spaces, a format of the color image is not limited. For example, in the embodiment of the present application, a format of the training sample set and the format of the image to be corrected are a red-green-blue (RGB) format. When an input color image is not in the RGB format such as a YUV format or other formats, an image in the RGB format is obtained through linear or nonlinear color space conversion. In addition, real light source marks of the color images in the training sample set are not limited. That is, in an embodiment, the training sample set includes color images with label illumination color parameters; in another embodiment, the training sample set includes color images without the label illumination color parameters.

In step 202, a sample chromatic-aberration-free point weight map of the color image of the training sample set is determined through a pre-constructed network model.

The pre-constructed network model has the capability to extract the chromatic-aberration-free point features in the image.

In an optional embodiment, the pre-constructed network model includes at least a convolution layer, an activation function layer, a pooling layer, and a deconvolution layer so that the input color image of the training sample set and the output sample chromatic-aberration-free point weight map have the same resolution.

Feature data of the image is extracted through the convolution layer, the activation function layer, and the pooling layer. In addition, to make the input color image of the training sample set and the output sample chromatic-aberration-free point weight map have the same resolution, the deconvolution layer is provided to process the feature data.

Figure 2B:
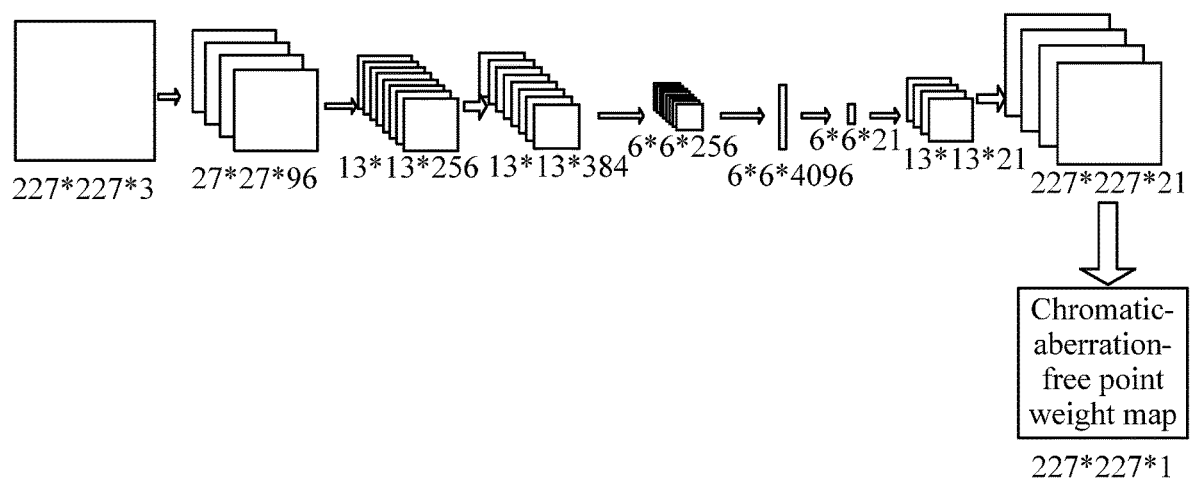
FIG. 2B is a schematic diagram showing a process where a pre-constructed network architecture in embodiment two of the present application processes an input image.

For example, an RGB-format image with 8-bit precision and a size of 227*227 is used as an input of the network model so that a fully convolutional neural network structure is constructed to predict a chromatic-aberration-free point weight map of the input image. An input layer of the network model is an image having a size of 227*227*3. As shown in FIG. 2B, a schematic diagram shows a process where a pre-constructed network architecture processes the input image, and the process is described below.

(1) After the input image is processed by a first convolution layer and an activation function relu, a size of data of the processed image remains unchanged; and then the processed image is processed by a max-pooling layer, and the feature data after the pooling has a size of 27*27*96.

(2) The size of data of the processed image subjected to the processing of a second convolution layer and the activation function relu remains unchanged; and then the processed image is processed by the max-pooling layer, and the feature data after the pooling has a size of 13*13*256.

(3) The output feature data obtained after the processing of a third convolution layer and the activation function relu has a size of 13*13*384.

(4) The size of the data subjected to the processing of a fourth convolution layer and the activation function relu remains unchanged; and then the processed data is processed by the max-pooling layer, and the feature data after the pooling has a size of 6*6*256.

(5) The output feature data obtained after the processing of a fifth convolution layer and the activation function relu has a size of 6*6*4096.

(6) The output feature data obtained after the processing of a sixth convolution layer and the activation function relu has a size of 6*6*21.

(7) The output feature data obtained after the processing of a first deconvolution layer and the activation function relu has a size of 13*13*21.

(8) The output feature data obtained after the processing of a second deconvolution layer and the activation function relu has a size of 227*227*21; and a maximum value of a corresponding position of 21-dimensional data is taken, and the chromatic-aberration-free point weight map of 227*227*1 is finally obtained.

The preceding network structure is only one embodiment of the present application, and the structure of the network model is not limited in the present application. The pre-constructed network model only needs to have the following characteristics: the input color image can be processed; the feature extracted through the convolution layer is the feature of the chromatic-aberration-free point in the image; the output of the network model is the chromatic-aberration-free point weight map; the number of convolution layers and the number of deconvolution layers are set so that it is ensured that the input image and the output image have the same size; and the size of the image input into the pre-constructed network model in the embodiment of the present application is not limited.

In step 203, a sample illumination color parameter of the color image of the training sample set is determined according to the sample chromatic-aberration-free point weight map.

The sample illumination color parameter is determined with reference to the method in step 102 in the preceding embodiment, and the details are not repeated here.

In step 204, a sample corrected image of the color image of the training sample set is determined according to the sample illumination color parameter.

The sample corrected image is determined with reference to the method in step 103 in the preceding embodiment, and the details are not repeated here.

In step 205, a backpropagation is performed on the chromatic-aberration-free point model according to image information of the sample corrected image and the sample chromatic-aberration-free point weight map so that parameters in the network model are adjusted.

An error of a chromatic-aberration-free point in the sample corrected image is determined according to the image information of the sample corrected image and the sample chromatic-aberration-free point weight map. A correction error of the sample corrected image is calculated through the error of the chromatic-aberration-free point. Further, the chromatic-aberration-free point model so that the parameters in the network model are adjusted. Thus, the network model extracts the chromatic-aberration-free point features more accurately, thereby improving the accuracy of the determination of the chromatic-aberration-free point weight map.

Optionally, for a color image with a label illumination color parameter in the training sample set, a label corrected image is determined through the label illumination color parameter, where the label illumination color parameter refers to a real illumination color parameter of the sample image and may be manually marked or may be determined through prior knowledge. Then, a loss function for supervised training is constructed such that an error of a chromatic-aberration-free point in the label corrected image and the error of the chromatic-aberration-free point in the sample corrected image are calculated and further the errors are continuously reduced through the backpropagation so that the function of adjusting the parameters in the network model is implemented, thereby improving the capability of the network model to extract the features.

In the embodiment of the present application, the chromatic-aberration-free point features of the sample image are extracted through the pre-constructed network model, the sample corrected image is determined according to the sample chromatic-aberration-free point weight map obtained by the network model, and further the parameters in the network model are adjusted through the backpropagation of the sample corrected image, which improves the capability of the network model to extract the chromatic-aberration-free point features and further improves the accuracy of the determination of the chromatic-aberration-free point weight map. The chromatic-aberration-free point model obtained with this method can extract features of images to be corrected which are under various scenes, thereby improving the adaptability and accuracy of the white balance correction.

Embodiment Three

Figure 3:
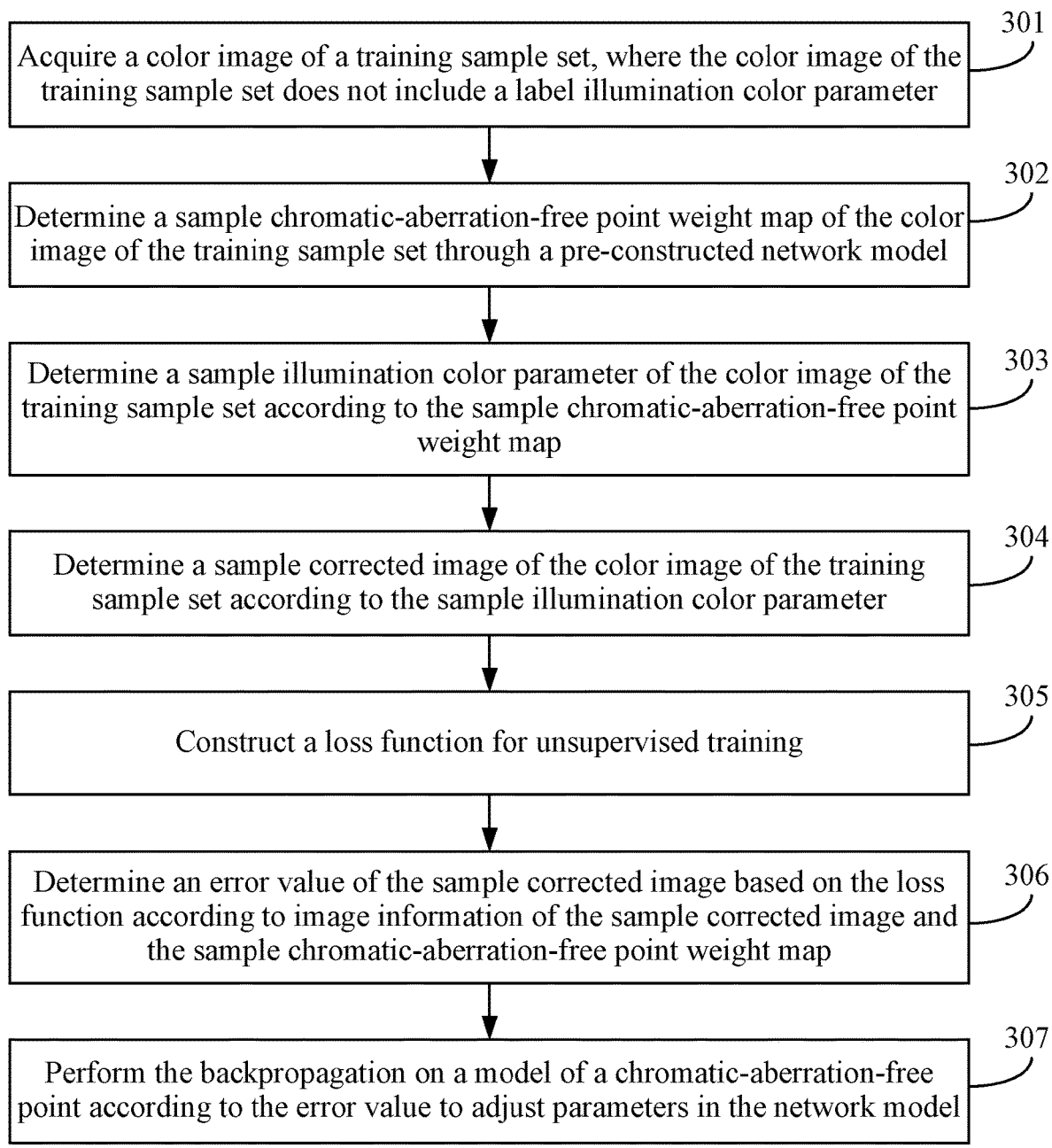
FIG. 3 is a flowchart of a training process of a model of a chromatic-aberration-free point in embodiment three of the present application.

FIG. 3 is a flowchart of a training process of a model of a chromatic-aberration-free point in embodiment three of the present application. In embodiment three, the description is performed based on the preceding embodiment. The embodiment of the present application is applicable to unsupervised training for the chromatic-aberration-free point model. As shown in FIG. 3, the training process includes the steps described below.

In step 301, the color image of the training sample set is acquired, where the color image of the training sample set does not include the label illumination color parameter.

The label illumination color parameter refers to the real illumination color parameter of the color image in the training sample set and may be manually marked in advance or may be determined through the prior knowledge. However, in the embodiment of the present application, for the color image of the training sample set, the label illumination color parameter does not need to be marked or acquired in advance, which improves the acquisition efficiency of the training sample set and simplifies the training process.

In step 302, the sample chromatic-aberration-free point weight map of the color image of the training sample set is determined through the pre-constructed network model.

In step 303, the sample illumination color parameter of the color image of the training sample set is determined according to the sample chromatic-aberration-free point weight map.

In step 304, the sample corrected image of the color image of the training sample set is determined according to the sample illumination color parameter.

In step 305, a loss function for the unsupervised training is constructed.

Since the color image in the training sample set has no label illumination color parameter, the loss function for the unsupervised training needs to be constructed according to features of the color image.

According to a nature of the color image, the color image may be expressed as:

$$f^i(x,y)=E^i(x,y)\cdot R^i(x,y),\ i\in\{R,G,B\};$$

where $f^i(x, y)$ denotes a pixel value of an i channel of the color image at the pixel $(x, y)$; $E^i(x, y)$ denotes an illumination color parameter of the i channel of the color image at the pixel $(x, y)$; and $R^i(x, y)$ denotes a surface reflectance value of the i channel of the color image at the pixel $(x, y)$, where the surface reflectance value denotes an inherent value of the pixel, is not influenced by the ambient light source, and is an inherent feature of an object.

Further, a logarithmic domain representation of the preceding formula is obtained:

$$\log(f^i(x,y))=\log(E^i(x,y))+\log(R^i(x,y)).$$

The color image is divided into multiple local regions. The light source may be considered to be uniform in the local regions of the color image. Therefore, $E^i(x, y)$ of multiple channels of a pixel in a local region may be considered to be equal to each other. According to the chromatic-aberration-free point features, $R^i(x, y)$ of multiple channels of the chromatic-aberration-free point are the same. Therefore, a chromatic-aberration-free point in the local region conforms to the following rule: $\log(f^R(x, y))=\log(f^G(x, y))=\log(f^B(x, y))\neq 0$. Therefore, for the corrected image, when multiple channel values of a pixel at which each chromatic-aberration-free point in the corrected image is located are equal to each other or approximately equal to each other, a color in the corrected image is approximate to a real color of the object.

Therefore, according to the principle that the multiple channel values of the pixel where each chromatic-aberration-free point in the corrected image is located are equal to each other or approximately equal to each other, the loss function for the unsupervised training is constructed. An error between the multiple channel values of each chromatic-aberration-free point in the corrected image may be determined through the constructed loss function, further, an error of the corrected image is determined through the loss function, and the image correction result is determined.

In an optional embodiment, the loss function for the unsupervised training is constructed through the following formulas:

$$\mathrm{Loss}(I) = \sum_{i=1}^{n} \frac{p_i}{L_i},$$

$$p = \sqrt{\frac{1}{3}\sum_{t\in\{R,G,B\}} \frac{(SD_t - \overline{SD})^2}{\overline{SD}}}\ ;\text{and}$$

$$\overline{SD} = \frac{1}{3}(SD_R + SD_G + SD_B);$$

where I denotes a sample corrected image whose error value is to be calculated; i denotes a sequence number of a pre-divided local image patch in the sample corrected image; n denotes that the sample corrected image is divided into n local image patches; $p_i$ denotes a local contrast ratio of an i-th local image patch; $L_i$ denotes a brightness value of the i-th local image patch; t denotes a sequence number of a channel among three channels of an image; $SD_t$ denotes a local variance of a local image patch on a t channel; and $\overline{SD}$ denotes an average of local variances of the local image patch on the three channels. A value of p may be expressed as a contrast ratio of the local region and may measure a dispersion degree of a gray value of the local region. Smaller p may indicate that a smaller difference in the gray value in this region and may further indicate a greater probability that the point in this region is the chromatic-aberration-free point.

The sample corrected image is divided into the n local image patches. A local contrast ratio of the local image patch is determined according to pixel values of multiple chromatic-aberration-free points in the local image patch, and an average brightness value in each local image patch is determined. The average brightness value may be determined according to an average value of pixel values of multiple pixels. For example, an average brightness value of the pixel $(x, y)$ is determined according to the formula $L(x, y)=(f^R(x, y)+f^G(x, y)+f^B(x, y))/3$. In addition, an average brightness value of all pixels in the local image patch is used as the average brightness value of the local image patch. A sum of ratios of local contrast ratios of all local image patches to average brightness values of all the local image patches is used as the loss function. Since multiple channel values of a pixel where each chromatic-aberration-free point in an accurately corrected image is located are equal to each other or approximately equal to each other, a local contrast ratio of a pixel value of each chromatic-aberration-free point in the sample corrected image should tend to zero and a value of the loss function also tends to zero, that is, the accuracy of the image correction result may be determined through the loss function.

The local contrast ratio of the local image patch is determined through variances of pixel values of multiple channels of the local image patch. The variances of the pixel values of the multiple channels of the local image patch are determined through a variance calculation formula such that variances of a red channel, a green channel, and a blue channel are obtained separately, and the average of local variances of the local image patch is obtained according to the variances of the multiple channels. The local contrast ratio is determined through a relationship between each of the variances of the multiple channels in the local image patch and the average variance of the multiple channels in the local image patch, which reflects a contrast ratio of a chromatic-aberration-free pixel in the local image patch accurately and improves the accuracy of the construction of the loss function.

In step 306, the error value of the sample corrected image is determined based on the loss function according to the image information of the sample corrected image and the sample chromatic-aberration-free point weight map.

The chromatic-aberration-free point in the sample corrected image is determined according to the image information of the sample corrected image and the sample chromatic-aberration-free point weight map. Further, errors of multiple channel values of the chromatic-aberration-free point are determined based on the pre-constructed loss function. An overall situation of errors of multiple channel values of all chromatic-aberration-free points is used as the error value of the sample corrected image. When the obtained chromatic-aberration-free point weight map is accurate, the error value of the sample corrected image obtained correspondingly should tend to zero. Therefore, the accuracy of an output result of the network model may be determined through the error value, thereby determining the accuracy of the white balance correction performed through the network model.

In an optional embodiment, step 306 includes the steps described below.

A corrected weight image is determined through the formula $$f_L^t(x, y) = \frac{\omega(x, y) * white^t(x, y)}{\Sigma \omega(x, y)},$$

t∈{R, G, B} according to the image information of the sample corrected image and the sample chromatic-aberration-free point weight map.

The error value of the sample corrected image is determined based on the loss function and the corrected weight image.

$f_L^t(x, y)$ denotes a t channel value at a pixel (x, y) in the corrected weight image, ω(x, y) denotes a chromatic-aberration-free point weight value at the pixel (x, y) determined according to the sample chromatic-aberration-free point weight map white$^t$(x, y) denotes a t channel value at a pixel (x, y) in the sample corrected image, and Σω(x, y) denotes a weight sum of all pixels in the sample chromatic-aberration-free point weight map.

The corrected weight image determined according to the formula $$f_L^t(x, y) = \frac{\omega(x, y) * white^t(x, y)}{\Sigma \omega(x, y)},$$

t∈{R, G, B} may reflect the chromatic-aberration-free point in the sample corrected image, and an influence degree of the chromatic-aberration-free point in the sample corrected image may be reflected through the sample chromatic-aberration-free point weight map, thereby improving the accuracy of the error value determined according to the corrected weight image.

Since the error value calculated through the loss function needs to reflect the error values of the multiple channels of the chromatic-aberration-free point in the image, the corrected weight image is calculated through the preceding formula, thereby reflecting the chromatic-aberration-free point. The value of the loss function is calculated according to image information in the corrected weight image and used as the error value of the sample corrected image. For example, based on the preceding example, the corrected weight image is divided into n local image patches, and local contrast ratios and average brightness values of the multiple local image patches are calculated so that the value of the loss function is obtained.

In step 307, the backpropagation is performed on the chromatic-aberration-free point model according to the error value so that the parameters in the network model are adjusted.

According to the error value, the backpropagation is performed with the error backpropagation method so that the parameters in the network model are adjusted, thereby obtaining an updated sample chromatic-aberration-free point weight map. For example, higher weight values may be assigned, through the backpropagation of the error value, to pixels in the image which may be chromatic-aberration-free points so that the updated sample chromatic-aberration-free point weight map is obtained. A new round of error calculations of the sample corrected image are performed according to the updated sample chromatic-aberration-free point weight map. The error value is minimized through continuous iteration, and the iteration is stopped. The parameters of the network model in this case are optimal, which can improve the capability of the network model to extract the chromatic-aberration-free point features and ensure the accuracy of the determination of the chromatic-aberration-free point weight map.

In the embodiment of the present application, the loss function for the unsupervised training is constructed so that the training process of an unsupervised model is implemented, which avoids the need for the work of marking the training sample set in advance and improves training efficiency. In addition, the loss function for the unsupervised training can truly reflect the correction accuracy of the sample corrected image, thereby improving the capability of the network model to extract the chromatic-aberration-free point features.

Embodiment Four

Figure 4:
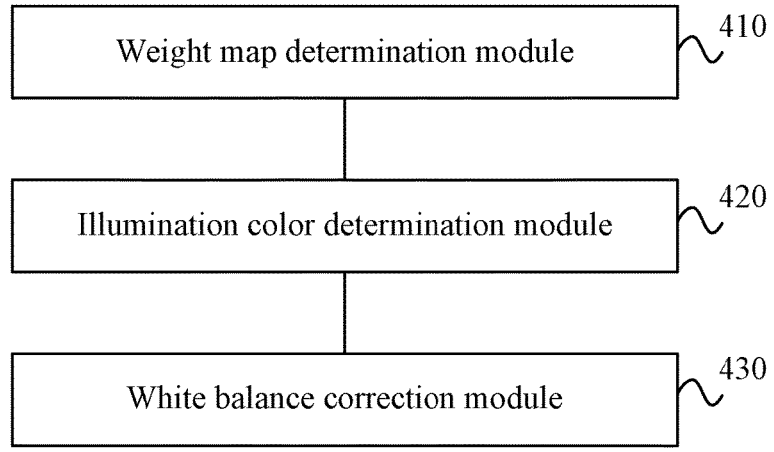
FIG. 4 is a structure diagram of a white balance correction apparatus in embodiment four of the present application.

FIG. 4 is a structure diagram of a white balance correction apparatus in embodiment four of the present application. This embodiment is applicable to the case where white balance correction is performed on an image acquired by a camera. As shown in FIG. 4, the apparatus includes a weight map determination module 410, an illumination color determination module 420, and a white balance correction module 430.

The weight map determination module 410 is configured to input an image to be corrected into a pre-trained chromatic-aberration-free point model to obtain a chromatic-aberration-free point weight map of the image to be corrected.

The illumination color determination module 420 is configured to determine, according to the chromatic-aberration-free point weight map, an illumination color parameter of the image to be corrected.

The white balance correction module 430 is configured to perform, according to the illumination color parameter, white balance correction on the image to be corrected to obtain a corrected image.

In the embodiment of the present application, the chromatic-aberration-free point weight map of the image to be corrected is determined based on the pre-trained chromatic-aberration-free point model, the illumination color parameter of the image to be corrected is obtained according to the chromatic-aberration-free point weight map, and the white balance correction is performed according to the illumination color parameter so that the white balance correction of the image to be corrected is implemented. The white balance correction method in the embodiment of the present application does not limit the scenes of the image to be corrected, which can improve the adaptability of the white balance correction and improve the accuracy of an image correction result.

Optionally, the apparatus includes a model training module configured to train a chromatic-aberration-free point model. The model training module includes a sample image acquisition unit, a sample weight map determination unit, a sample illumination color determination unit, a sample corrected image determination unit, and a network parameter optimization unit.

The sample image acquisition unit is configured to acquire a color image of a training sample set.

The sample weight map determination unit is configured to determine a sample chromatic-aberration-free point weight map of the color image of the training sample set through a pre-constructed network model.

The sample illumination color determination unit is configured to determine a sample illumination color parameter of the color image of the training sample set according to the sample chromatic-aberration-free point weight map.

The sample corrected image determination unit is configured to determine a sample corrected image of the color image of the training sample set according to the sample illumination color parameter.

The network parameter optimization unit is configured to perform the backpropagation on the chromatic-aberration-free point model according to image information of the sample corrected image and the sample chromatic-aberration-free point weight map to adjust parameters in the network model.

Optionally, the color image of the training sample set does not include a label illumination color parameter.

The network parameter optimization unit includes a loss function constructing subunit, an error value determination subunit, and a backpropagation subunit.

The loss function constructing subunit is configured to construct a loss function for unsupervised training.

The error value determination subunit is configured to determine an error value of the sample corrected image based on the loss function according to the image information of the sample corrected image and the sample chromatic-aberration-free point weight map.

The backpropagation subunit is configured to perform a backpropagation on the chromatic-aberration-free point model according to the error value to adjust the parameters in the network model.

Optionally, the loss function for the unsupervised training is constructed through the following formulas:

$$\text{Loss}(I) = \sum_{i=1}^{n} \frac{p_i}{L_i},$$

$$p = \sqrt{\frac{1}{3} \sum_{t \in \{R,G,B\}} \frac{(SD_t - \overline{SD})^2}{\overline{SD}}} \text{; and}$$

$$\overline{SD} = \frac{1}{3}(SD_R + SD_G + SD_B);$$

where I denotes a sample corrected image whose error value is to be calculated; i denotes a sequence number of a pre-divided local image patch in the sample corrected image; n denotes that the sample corrected image is divided into n local image patches; $p_i$ denotes a local contrast ratio of an i-th local image patch; $L_i$ denotes a brightness value of the i-th local image patch; t denotes a sequence number of a channel among three channels of an image; $SD_t$ denotes a local variance of a local image patch on a t channel; and $\overline{SD}$ denotes an average of local variances of the local image patch on the three channels.

Optionally, the error value determination subunit is configured to perform the steps described below.

A corrected weight image is determined through the formula $$f_L^t(x, y) = \frac{\omega(x, y) * \text{white}^t(x, y)}{\Sigma \omega(x, y)},$$

t∈{R, G, B} according to the image information of the sample corrected image and the sample chromatic-aberration-free point weight map.

The error value of the sample corrected image is determined based on the loss function and the corrected weight image.

$f_L^t(x, y)$ denotes a t channel value at a pixel (x, y) in the corrected weight image, $\omega(x, y)$ denotes a chromatic-aberration-free point weight value at the pixel (x, y) determined according to the sample chromatic-aberration-free point weight map white$^t$(x y) denotes a t channel value at a pixel (x, y) in the sample corrected image, and $\Sigma \omega(x, y)$ denotes a weight sum of all pixels in the sample chromatic-aberration-free point weight map.

Optionally, the pre-constructed network model includes at least a convolution layer, an activation function layer, a pooling layer, and a deconvolution layer so that the input color image of the training sample set and the output sample chromatic-aberration-free point weight map have the same resolution.

Optionally, the illumination color parameter e=[r, g, b] is determined through the following formulas:

$$r = \frac{R_{avg}}{\sqrt{R_{avg}^2 + G_{avg}^2 + B_{avg}^2}};$$

$$g = \frac{G_{avg}}{\sqrt{R_{avg}^2 + G_{avg}^2 + B_{avg}^2}}; \text{and}$$

$$b = \frac{B_{avg}}{\sqrt{R_{avg}^2 + G_{avg}^2 + B_{avg}^2}};$$

-continued $$\text{where } R_{avg} = \frac{\Sigma(\omega(x, y) * f^R(x, y))}{\Sigma \omega(x, y)},$$

$$G_{avg} = \frac{\Sigma(\omega(x, y) * f^G(x, y))}{\Sigma \omega(x, y)},$$

$$\text{and } B_{avg} = \frac{\Sigma(\omega(x, y) * f^B(x, y))}{\Sigma \omega(x, y)},$$

where ω(x, y) denotes a chromatic-aberration-free point weight value at a pixel (x, y) determined according to the chromatic-aberration-free point weight map, σω(x, y) denotes a weight sum of all pixels in the chromatic-aberration-free point weight map, $f^R(x, y)$ denotes an R channel value at a pixel (x, y) in the image to be corrected, $f^G(x, y)$ denotes a G channel value at the pixel (x, y) in the image to be corrected, and $f^B(x, y)$ denotes a B channel value at the pixel (x, y) in the image to be corrected.

Optionally, the corrected image is determined through the following formulas:

$$\begin{cases} \text{white}^R(x, y) = f^R(x, y)/r \\ \text{white}^G(x, y) = f^G(x, y)/g \\ \text{white}^B(x, y) = f^B(x, y)/b \end{cases}$$

where $\text{white}^R(x, y)$ denotes an R channel value at a pixel (x, y) in the corrected image, $\text{white}^G(x, y)$ denotes a G channel value at the pixel (x, y) in the corrected image, and $\text{white}^B(x, y)$ denotes a B channel value at the pixel (x, y) in the corrected image.

The white balance correction apparatus provided in the embodiment of the present application may execute the white balance correction method provided in any embodiment of the present application and has corresponding functional modules and effects for executing the white balance correction method.

Embodiment Five

Figure 5:
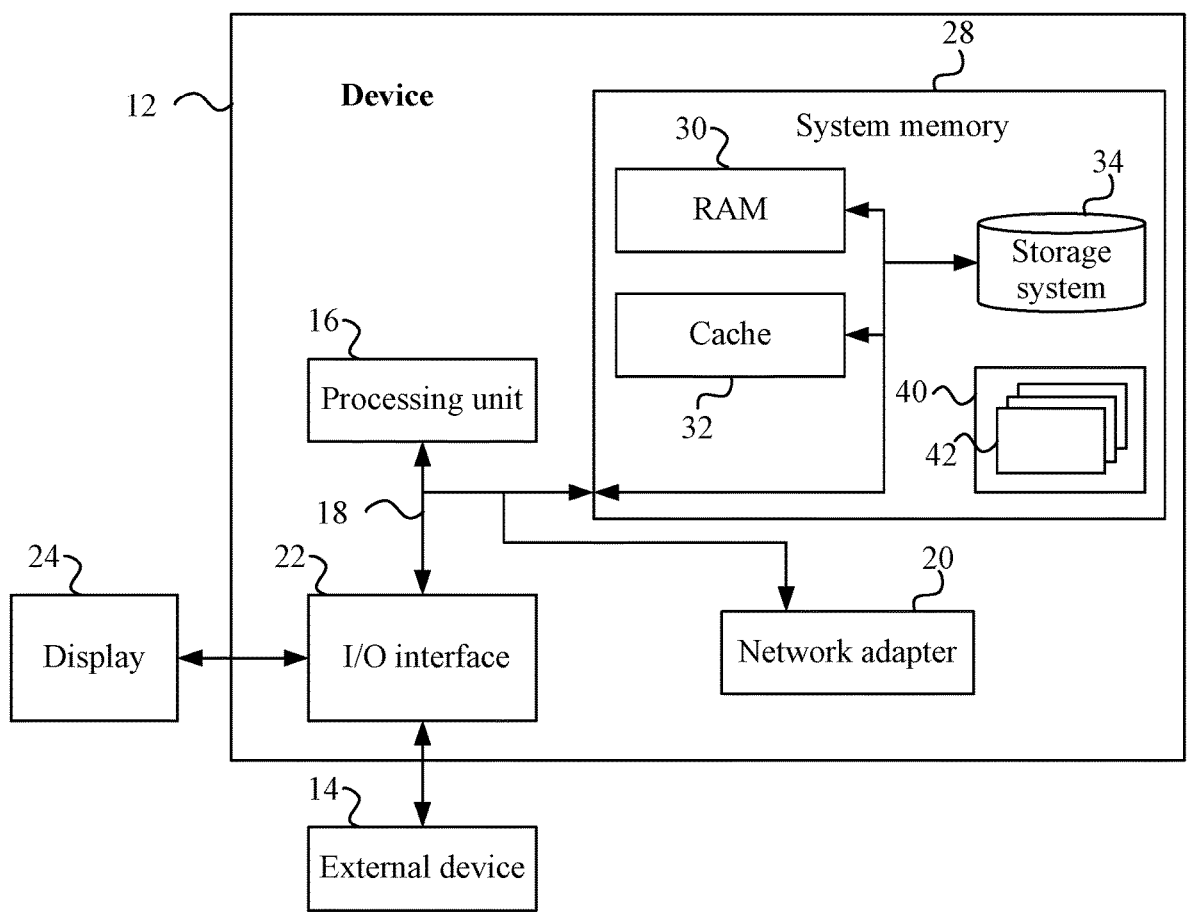
FIG. 5 is a structure diagram of a device in embodiment five of the present application.

FIG. 5 is a structure diagram of a device according to embodiment five of the present application. FIG. 5 shows a block diagram of an exemplary device 12 for implementing embodiments of the present application. The device 12 shown in FIG. 5 is only an example and is not intended to limit the function and use scope of the embodiments of the present application.

As shown in FIG. 5, the device 12 is represented in a form of a general-purpose computing device. Components of the device 12 may include one or more processors or processing units 16, a system memory 28, and a bus 18 which connects various system components (including the system memory 28 and the processing unit 16).

The bus 18 represents one or more of several types of bus structures, including a memory bus or a memory controller, a peripheral bus, an accelerated graphics port, a processor, or a local bus using any of various bus structures. For example, these architectures include an Industry Standard Architecture (ISA) bus, a Micro Channel Architecture (MCA) bus, an enhanced ISA bus, a Video Electronics Standards Association (VESA) local bus, and a Peripheral Component Interconnect (PCI) bus.

The device 12 includes various computer system readable media. These media may be available media that can be accessed by the device 12. These media include volatile and non-volatile media, and removable and non-removable media.

The system memory 28 may include a computer system readable medium in the form of a volatile memory, such as a random-access memory (RAM) 30 and/or a cache 32. The device 12 may include other removable/non-removable, volatile/non-volatile computer system storage media. By way of example only, a storage system 34 may be configured to read from and write to a non-removable and non-volatile magnetic medium (not shown in FIG. 5 and commonly referred to as a "hard disk drive"). Although not shown in FIG. 5, a magnetic disk drive for reading from and writing to a removable and non-volatile magnetic disk (such as a "floppy disk"), and an optical disk drive for reading from and writing to a removable and non-volatile optical disk (such as a compact disk read-only memory (CD-ROM), a Digital Video Disk-Read Only Memory (DVD-ROM), or other optical media) may be provided. In these cases, each drive may be connected to the bus 18 through one or more data media interfaces. The system memory 28 may include at least one program product having a set of program modules (for example, at least one program module). These program modules are configured to perform functions of multiple embodiments of the present application.

A program/utility 40, having a set (at least one) of program modules 42, may be stored, for example, in the system memory 28. Such program modules 42 include an operating system, one or more application programs, other program modules, and program data. Each or one combination of these examples may include an implementation of a network environment. The program modules 42 generally perform functions and/or methods in the embodiments of the present application.

The device 12 may also communicate with one or more external devices 14 (for example, a keyboard, a pointing device, a display 24). The device 12 may also communicate with one or more devices that enable a user to interact with the device 12, and/or with any device (for example, a network card or a modem) that enables the device 12 to communicate with one or more other computing devices. Such communication may be performed through an input/output (I/O) interface 22. Moreover, the device 12 may also communicate with one or more networks (for example, a local area network (LAN), a wide area network (WAN), and/or a public network such as the Internet) through a network adapter 20. As shown in FIG. 5, the network adapter 20 communicates with other modules of the device 12 via the bus 18. Although not shown in FIG. 5, other hardware and/or software modules may be used in conjunction with the device 12, including a microcode, a device drive, a redundant processing unit, an external disk drive array, a redundant array of independent disks (RAID) system, a tape drive, and a data backup storage system, and the like.

The processing unit 16 executes various functional applications and data processing by running programs stored in the system memory 28, so as to implement the white balance correction method provided by the embodiments of the present application. The method includes the steps described below.

An image to be corrected is input into a pre-trained chromatic-aberration-free point model so that a chromatic-aberration-free point weight map of the image to be corrected is obtained.

An illumination color parameter of the image to be corrected is determined according to the chromatic-aberration-free point weight map.

White balance correction is performed, according to the illumination color parameter, on the image to be corrected so that a corrected image is obtained.

Embodiment Six

Embodiment six of the present application also provides a computer-readable storage medium storing computer programs, where when executed by a processor, the computer programs implement the white balance correction method according to the embodiment of the present application. The method includes the steps described below.

An image to be corrected is input into a pre-trained chromatic-aberration-free point model so that a chromatic-aberration-free point weight map of the image to be corrected is obtained.

An illumination color parameter of the image to be corrected is determined according to the chromatic-aberration-free point weight map.

White balance correction is performed, according to the illumination color parameter, on the image to be corrected so that a corrected image is obtained.

A computer storage medium in the embodiments of the present application may adopt any combination of one or more computer-readable media. The computer-readable medium may be a computer-readable signal medium or a computer-readable storage medium. The computer-readable storage medium may be, for example, an electronic, magnetic, optical, electromagnetic, infrared, or semiconductor system, apparatus, or device, or any combination thereof. Computer-readable storage media include: an electrical connection having one or more wires, a portable computer disk, a hard disk, a random-access memory (RAM), a read-only memory (ROM), an erasable programmable read-only memory (EPROM), a flash memory, an optical fiber, a CD-ROM, an optical memory device, a magnetic memory device, or any suitable combination thereof. In this document, the computer-readable storage medium may be any tangible medium including or storing a program. The program may be used by or used in conjunction with an instruction execution system, apparatus, or device.

The computer-readable signal medium may include a data signal propagated in a baseband or as part of a carrier. Computer-readable program codes are carried in the data signal. The data signal propagated in this manner may be in various forms including an electromagnetic signal, an optical signal, or any suitable combination thereof. The computer-readable signal medium may be any computer-readable medium other than the computer-readable storage medium. The computer-readable medium may send, propagate, or transmit a program used by or used in conjunction with an instruction execution system, apparatus, or device.

The program code embodied on the computer-readable medium may be transmitted using any appropriate medium, including wireless, wire, optical cable, Radio Frequency (RF), or the like, or any appropriate combination thereof.

Computer program codes for performing the operations of the present application may be written in one or more programming languages or a combination thereof, the programming languages including object-oriented programming languages such as Java, Smalltalk, C++ and further including conventional procedural programming languages such as C programming language or similar programming languages. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer through any type of network, including a LAN or a WAN or may be connected to an external computer (for example, through the Internet provided by an Internet service provider).

What is claimed is:

1. A white balance correction method, comprising:

inputting an image to be corrected into a pre-trained chromatic-aberration-free point model to obtain a chromatic-aberration-free point weight map of the image to be corrected;

determining, according to the chromatic-aberration-free point weight map, an illumination color parameter of the image to be corrected; and performing, according to the illumination color parameter, white balance correction on the image to be corrected to obtain a corrected image.

2. The method according to claim 1, wherein a training process of the pre-trained chromatic-aberration-free point model comprises:

acquiring a color image of a training sample set;

determining a sample chromatic-aberration-free point weight map of the color image of the training sample set through a pre-constructed network model;

determining a sample illumination color parameter of the color image of the training sample set according to the sample chromatic-aberration-free point weight map;

determining a sample corrected image of the color image of the training sample set according to the sample illumination color parameter; and performing a backpropagation on the chromatic-aberration-free point model according to image information of the sample corrected image and the sample chromatic-aberration-free point weight map to adjust parameters in the network model.

3. The method according to claim 2, wherein the color image of the training sample set does not comprise a label illumination color parameter;

wherein performing the backpropagation on the chromatic-aberration-free point model according to the image information of the sample corrected image and the sample chromatic-aberration-free point weight map to adjust the parameters in the network model comprises:

constructing a loss function for unsupervised training;

determining an error value of the sample corrected image based on the loss function according to the image information of the sample corrected image and the sample chromatic-aberration-free point weight map; and performing the backpropagation on the chromatic-aberration-free point model according to the error value to adjust the parameters in the network model.

4. The method according to claim 3, wherein the loss function for the unsupervised training is constructed through following formulas:

$$\text{Loss}(I) = \sum_{i=1}^{n} \frac{p_i}{L_i},$$

$$p = \sqrt{\frac{1}{3}\sum_{t \in \{R,G,B\}} \frac{(SD_t - \overline{SD})^2}{\overline{SD}}}; \text{ and}$$

$$\overline{SD} = \frac{1}{3}(SD_R + SD_G + SD_B);$$

wherein I denotes a sample corrected image whose error value is to be calculated; i denotes a sequence number of a pre-divided local image patch in the sample corrected image; n denotes that the sample corrected image is divided into n local image patches; $p_i$ denotes a local contrast ratio of an i-th local image patch; $L_i$ denotes a brightness value of the i-th local image patch; t denotes a sequence number of a channel among three channels of an image; $SD_t$ denotes a local variance of a local image patch on a t channel; and $\overline{SD}$ denotes an average of local variances of the local image patch on the three channels.

5. The method according to claim 3, wherein determining the error value of the sample corrected image based on the loss function according to the image information of the sample corrected image and the sample chromatic-aberration-free point weight map comprises:

determining a corrected weight image through a formula $$f_L^t(x, y) = \frac{\omega(x, y) * \text{white}^t(x, y)}{\Sigma \omega(x, y)},$$

$t \in \{R, G, B\}$ according to the image information of the sample corrected image and the sample chromatic-aberration-free point weight map; and determining the error value of the sample corrected image based on the loss function and the corrected weight image;

wherein $f_L^t(x, y)$ denotes a t channel value at a pixel (x, y) in the corrected weight image, $\omega(x, y)$ denotes a chromatic-aberration-free point weight value at the pixel (x, y) determined according to the sample chromatic-aberration-free point weight map, $\text{white}^t(x, y)$ denotes a t channel value at a pixel (x, y) in the sample corrected image, and $\Sigma \omega(x, y)$ denotes a weight sum of all pixels in the sample chromatic-aberration-free point weight map.

6. The method according to claim 2, wherein the pre-constructed network model comprises at least a convolution layer, an activation function layer, a pooling layer, and a deconvolution layer so that an input color image of the training sample set and an output sample chromatic-aberration-free point weight map have a same resolution.

7. The method according to claim 1, wherein the illumination color parameter e=[r, g, b] is determined through following formulas:

$$r = \frac{R_{avg}}{\sqrt{R_{avg}^2 + G_{avg}^2 + B_{avg}^2}};$$

$$g = \frac{G_{avg}}{\sqrt{R_{avg}^2 + G_{avg}^2 + B_{avg}^2}}; \text{ and}$$

$$b = \frac{B_{avg}}{\sqrt{R_{avg}^2 + G_{avg}^2 + B_{avg}^2}};$$

wherein $R_{avg} = \frac{\Sigma(\omega(x, y) * f^R(x, y))}{\Sigma \omega(x, y)},$ $G_{avg} = \frac{\Sigma(\omega(x, y) * f^G(x, y))}{\Sigma \omega(x, y)},$ and $B_{avg} = \frac{\Sigma(\omega(x, y) * f^B(x, y))}{\Sigma \omega(x, y)},$ wherein $\omega(x, y)$ denotes a chromatic-aberration-free point weight value at a pixel (x, y) determined according to the chromatic-aberration-free point weight map, $\Sigma \omega(x, y)$ denotes a weight sum of all pixels in the chromatic-aberration-free point weight map, $f^R(x, y)$ denotes an R channel value at a pixel (x, y) in the image to be corrected, $f^G(x, y)$ denotes a G channel value at the pixel (x, y) in the image to be corrected, and $f^B(x, y)$ denotes a B channel value at the pixel (x, y) in the image to be corrected.

8. The method according to claim 7, wherein the corrected image is determined through following formulas:

$$\begin{cases} \text{white}^R(x, y) = f^R(x, y)/r \\ \text{white}^G(x, y) = f^G(x, y)/g \\ \text{white}^B(x, y) = f^B(x, y)/b \end{cases};$$

wherein $\text{white}^R(x, y)$ denotes an R channel value at a pixel (x, y) in the corrected image, $\text{white}^G(x, y)$ denotes a G channel value at the pixel (x, y) in the corrected image, and $\text{white}^B(x, y)$ denotes a B channel value at the pixel (x, y) in the corrected image.

9. A device, comprising:
one or more processors; and
a memory configured to store one or more programs;
wherein when executed by the one or more processors, the one or more programs cause the one or more processors to implement the following steps:
inputting an image to be corrected into a pre-trained chromatic-aberration-free point model to obtain a chromatic-aberration-free point weight map of the image to be corrected;
determining, according to the chromatic-aberration-free point weight map, an illumination color parameter of the image to be corrected; and
performing, according to the illumination color parameter, white balance correction on the image to be corrected to obtain a corrected image.

10. The device according to claim 9, wherein a training process of the pre-trained chromatic-aberration-free point model comprises:
acquiring a color image of a training sample set;
determining a sample chromatic-aberration-free point weight map of the color image of the training sample set through a pre-constructed network model;
determining a sample illumination color parameter of the color image of the training sample set according to the sample chromatic-aberration-free point weight map;
determining a sample corrected image of the color image of the training sample set according to the sample illumination color parameter; and performing a backpropagation on the chromatic-aberration-free point model according to image information of the sample corrected image and the sample chromatic-aberration-free point weight map to adjust parameters in the network model.

11. The device according to claim 10, wherein the color image of the training sample set does not comprise a label illumination color parameter;

wherein performing the backpropagation on the chromatic-aberration-free point model according to the image information of the sample corrected image and the sample chromatic-aberration-free point weight map to adjust the parameters in the network model comprises:

constructing a loss function for unsupervised training;

determining an error value of the sample corrected image based on the loss function according to the image information of the sample corrected image and the sample chromatic-aberration-free point weight map; and performing the backpropagation on the chromatic-aberration-free point model according to the error value to adjust the parameters in the network model.

12. The device according to claim 11, wherein the loss function for the unsupervised training is constructed through following formulas:

$$\text{Loss}(l) = \sum_{i=1}^{n} \frac{p_i}{L_i},$$

$$p = \sqrt{\frac{1}{3} \sum_{t \in \{R,G,B\}} \frac{(SD_t - \overline{SD})^2}{\overline{SD}}}; \text{ and}$$

$$\overline{SD} = \frac{1}{3}(SD_R + SD_G + SD_B);$$

wherein I denotes a sample corrected image whose error value is to be calculated; i denotes a sequence number of a pre-divided local image patch in the sample corrected image; n denotes that the sample corrected image is divided into n local image patches; $p_i$ denotes a local contrast ratio of an i-th local image patch; $L_i$ denotes a brightness value of the i-th local image patch; t denotes a sequence number of a channel among three channels of an image; $SD_t$ denotes a local variance of a local image patch on a t channel; and $\overline{SD}$ denotes an average of local variances of the local image patch on the three channels.

13. The device according to claim 11, wherein determining the error value of the sample corrected image based on the loss function according to the image information of the sample corrected image and the sample chromatic-aberration-free point weight map comprises:

determining a corrected weight image through a formula $$f_L^t(x, y) = \frac{\omega(x, y) * \text{white}^t(x, y)}{\Sigma \omega(x, y)},$$

t ∈ {R, G, B} according to the image information of the sample corrected image and the sample chromatic-aberration-free point weight map; and determining the error value of the sample corrected image based on the loss function and the corrected weight image;

wherein $f_L^t(x, y)$ denotes a t channel value at a pixel (x, y) in the corrected weight image, ω(x, y) denotes a chromatic-aberration-free point weight value at the pixel (x, y) determined according to the sample chromatic-aberration-free point weight map, $\text{white}^t(x, y)$ denotes a t channel value at a pixel (x, y) in the sample corrected image, and Σω(x, y) denotes a weight sum of all pixels in the sample chromatic-aberration-free point weight map.

14. The device according to claim 10, wherein the pre-constructed network model comprises at least a convolution layer, an activation function layer, a pooling layer, and a deconvolution layer so that an input color image of the training sample set and an output sample chromatic-aberration-free point weight map have a same resolution.

15. The device according to claim 9, wherein the illumination color parameter e=[r, g, b] is determined through following formulas:

$$r = \frac{R_{avg}}{\sqrt{R_{avg}^2 + G_{avg}^2 + B_{avg}^2}};$$

$$g = \frac{G_{avg}}{\sqrt{R_{avg}^2 + G_{avg}^2 + B_{avg}^2}}; \text{ and}$$

$$b = \frac{B_{avg}}{\sqrt{R_{avg}^2 + G_{avg}^2 + B_{avg}^2}};$$

wherein $R_{avg} = \frac{\Sigma(\omega(x, y) * f^R(x, y))}{\Sigma \omega(x, y)},$ $G_{avg} = \frac{\Sigma(\omega(x, y) * f^G(x, y))}{\Sigma \omega(x, y)},$ and $B_{avg} = \frac{\Sigma(\omega(x, y) * f^B(x, y))}{\Sigma \omega(x, y)},$ wherein ω(x, y) denotes a chromatic-aberration-free point weight value at a pixel (x, y) determined according to the chromatic-aberration-free point weight map, Σω(x, y) denotes a weight sum of all pixels in the chromatic-aberration-free point weight map, $f^R(x, y)$ denotes an R channel value at a pixel (x, y) in the image to be corrected, $f^G(x, y)$ denotes a G channel value at the pixel (x, y) in the image to be corrected, and $f^B(x, y)$ denotes a B channel value at the pixel (x, y) in the image to be corrected.

16. The device according to claim 15, wherein the corrected image is determined through following formulas:

$$\begin{cases} \text{white}^R(x, y) = f^R(x, y)/r \\ \text{white}^G(x, y) = f^G(x, y)/g ; \\ \text{white}^B(x, y) = f^B(x, y)/b \end{cases}$$

wherein $\text{white}^R(x, y)$ denotes an R channel value at a pixel (x, y) in the corrected image, $\text{white}^G(x, y)$ denotes a G channel value at the pixel (x, y) in the corrected image, and $\text{white}^B(x, y)$ denotes a B channel value at the pixel (x, y) in the corrected image.

17. A non-transitory computer-readable storage medium storing computer programs, wherein when executed by a processor, the computer programs implement the following steps:

inputting an image to be corrected into a pre-trained chromatic-aberration-free point model to obtain a chromatic-aberration-free point weight map of the image to be corrected;

determining, according to the chromatic-aberration-free point weight map, an illumination color parameter of the image to be corrected; and performing, according to the illumination color parameter, white balance correction on the image to be corrected to obtain a corrected image.

* * * * *